E. J. SAVORY & N. R. RENZE.
NUT LOCK.
APPLICATION FILED DEC. 11, 1917.

1,278,028.

Patented Sept. 3, 1918.

Witnesses

Inventor
E. J. Savory
N. R. Renze

By their Attorney.

UNITED STATES PATENT OFFICE.

EUGENE J. SAVORY AND NICK R. RENZE, OF CONNELLSVILLE, PENNSYLVANIA.

NUT-LOCK.

1,278,028.  Specification of Letters Patent.  Patented Sept. 3, 1918.

Application filed December 11, 1917. Serial No. 206,584.

*To all whom it may concern:*

Be it known that we, EUGENE J. SAVORY and NICK R. RENZE, citizens of the United States, residing at Connellsville, in the county of Fayette, State of Pennsylvania, have invented a new and useful Nut-Lock; and we do hereby declare the following to be a full, clear, and exact description of the invention, such as will enable others skilled in the art to which it appertains to make and use the same.

This invention relates to an improved nut lock, particularly adapted for use in connection with various sizes of bolts, which may be employed for fastening or clamping together various parts, plates and the like.

One of the objects of the invention is the provision of a nut lock especially used on bolts employed for fastening rails and fish plates securely together, thereby preventing displacement of the rails and the attendant parts.

A further object of the invention is to provide a simple, efficient, cheap, durable and practicable nut lock, and one which may be manufactured for a small cost, owing to its inexpensive structure, and sold at a reasonable profit.

A further object of the invention is the provision of a nut lock consisting of improved features of construction, one of which involves the formation of a circular channel or pocket, any suitable shape in cross section, preferably rectangular, on the interior of the threaded bore of the nut, and in which improved spring locking devices are anchored or fastened, which devices are provided with V-shaped extremities adapted to ride over the threads of the bolt and engage any one of a plurality of longitudinally extending grooves extending substantially transversely of the threads of the bolt, for locking the nut in place, consequently preventing the same backing off from the bolt.

In practical fields the details of construction may necessitate alterations falling within the scope of what is claimed.

The invention comprises further features and combination of parts as hereinafter set forth shown in the drawings and claimed.

In the drawings:—

Figure 1:
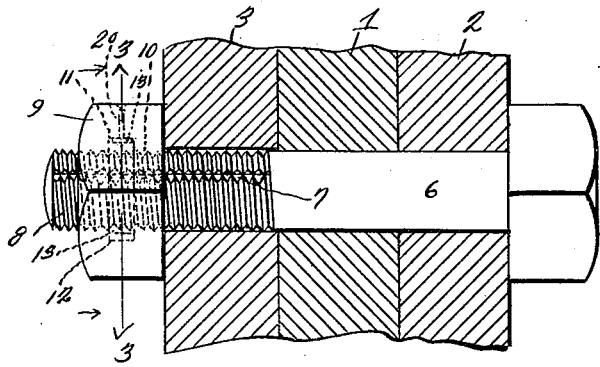
Figure 1 is a sectional view through a pair of members (which may be plates or the like, preferably a rail web and fish plates) showing a bolt extending therethrough and a nut locking device applied.
Figure 3:
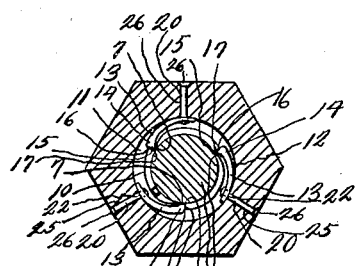
Fig. 3 is a sectional view on line 3—3 of Fig. 1.
Figures 2, 4:
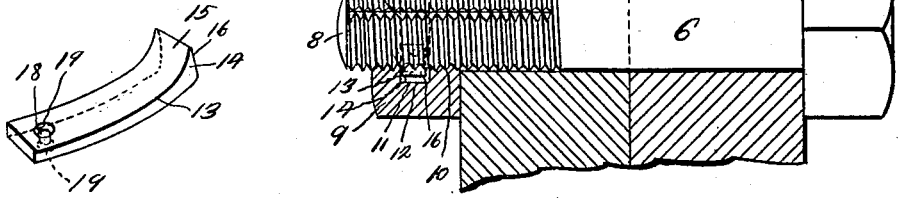
Fig. 2 is a sectional view through a pair of plates or the like, showing the bolt in elevation, the nut in section, and the nut locking device also applied.
Fig. 4 is a detail perspective view of one of the spring locking devices, showing an opening in one end thereof in which the fastening means may be preferably riveted.
Figure 5:
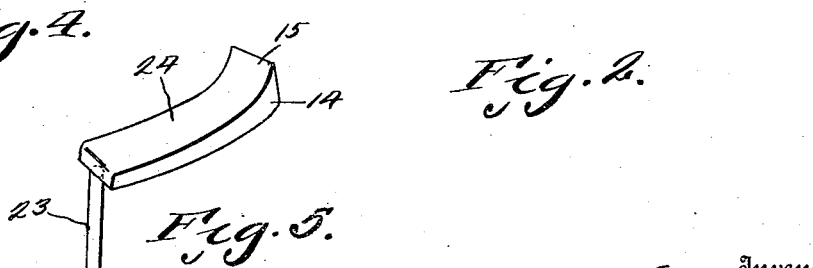
Fig. 5 is a detail perspective view of a spring locking device or member, showing its fastening means integrally carried therewith.

Referring more especially to the drawings, particularly Fig. 1, 1 designates a portion of a rail web and 2 and 3 denote fish plates, and in Fig. 2, 4 and 5 denote plates or the like to be clamped. Extending through the members 1, 2 and 3, or extending through the plates 4 and 5 is a conventional form of bolt 6. The shank of the bolt is provided with a plurality of grooves or channels 7, preferably three, and which are preferably V-shaped. These channels or grooves extend longitudinally of the shank of the bolt preferably transversely of the threads, and may be made, if desired, any other suitable shape. On the threaded end 8 of the bolt is a conventional form of nut 9. The threaded bore 10 has adjoining thereto a circular channel or pocket 11. Secured to the inner cylindrical face 12 of said pocket or channel (which may be any suitable shape preferably rectangular) is a plurality of spring locking devices or members 13. The free end or extremity of each device or member 13 preferably merges into an enlargement 14, the V-shaped tooth 15 of which subsequently to riding over the threads of the bolt shank is adapted to engage any one of the grooves or channels 7, whereby the free end face 16 of the enlargement may engage the shoulder or radial wall 17 of the channel or groove 7, thereby locking the nut home in close engagement with the plate or other member to be clamped, and consequently preventing the nut from backing off the bolt shank. As previously stated any number of grooves or channels 7 may be provided, and consequently this same rule applies to the spring locking devices. One method for anchoring each spring locking device consists in forming an opening or aperture 18 in the anchored end of the member 13, and either end of this aperture or opening or both thereof may have bevel countersinks 19. In this instance a suitable fastening pin 20 has a reduced extremity 21, which engages the aperture or opening 18, so that by riveting the end of said reduced extremity the spring locking device is secured between the riveted end and the shoulder 22, the shoulder and the riveted end engaging said countersinks 19. In Fig. 5 of the drawings the securing pin 23 is carried integrally with the spring locking device 24. In this instance said securing pin may be constructed as a part of the locking device in any suitable manner, for instance such as by bending the pin (which may be previously machined from one end of the device) laterally from said device. In fastening the spring locking device in the pocket or channel of the nut, it is first arranged in the channel or pocket prior to applying the nut to the shank of the bolt, whereby the pin may extend through an aperture 25 in the wall of the nut. The outer extremity of the pin 20 (or that of the pin 23) is then riveted as shown clearly in Figs. 2 and 3 in the countersink 26, whereby the extremity of the pin is made flush and given a machine finish with the outer face of the nut.

The invention having been set forth what is claimed as new and useful is:—

The combination with a bolt having its threaded end provided with a multiple of longitudinally extending grooves, of a nut engaging the threaded end, a circular chamber formed centrally of the interior wall of the threaded bore of the nut, spring blade locking devices anchored to the inner circular wall of said chamber, whereby the side walls of the chamber may hold the locking devices firm and against lateral pivotal movement, the free extremities of said devices terminating in V-shaped enlargements adapted to engage shoulders of certain of said grooves of the bolt, and means comprising riveted pins passing radially through the wall of the nut for fastening said devices in the chamber.

In testimony whereof we have signed our names to this specification in the presence of two subscribing witnesses.

EUGENE J. SAVORY.
NICK R. RENZE.

Witnesses:
ELEANOR CLEMENTS,
ROBERT A. BOSWELL.

Copies of this patent may be obtained for five cents each, by addressing the "Commissioner of Patents, Washington, D. C."